United States Patent
Arunkumar et al.

(10) Patent No.: US 9,432,843 B2
(45) Date of Patent: Aug. 30, 2016

(54) TECHNIQUES FOR LOCATION INFORMATION CONTROL USING USER PROFILES

(71) Applicant: INTERNATIONAL BUSINESS MACHINES CORPORATION, Armonk, NY (US)

(72) Inventors: Saritha Arunkumar, Basingstoke (GB); Mudhakar Srivatsa, Yorktown Heights, NY (US); Stephen D. Pipes, Hursley (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/725,184

(22) Filed: May 29, 2015

(65) Prior Publication Data

US 2015/0350891 A1 Dec. 3, 2015

(30) Foreign Application Priority Data

May 30, 2014 (GB) .................................. 1409610.1

(51) Int. Cl.
*H04W 24/00* (2009.01)
*H04W 12/02* (2009.01)
*H04W 4/02* (2009.01)

(52) U.S. Cl.
CPC .............. *H04W 12/02* (2013.01); *H04W 4/02* (2013.01)

(58) Field of Classification Search
None
See application file for complete search history.

(56) References Cited

U.S. PATENT DOCUMENTS

| | | | |
|---|---|---|---|
| 8,401,867 B2 | 3/2013 | Lagadec et al. | |
| 8,402,117 B2 | 3/2013 | Zellner et al. | |
| 8,489,110 B2 | 7/2013 | Frank et al. | |
| 8,559,927 B2 | 10/2013 | Kim | |
| 8,639,221 B1 * | 1/2014 | Zang | H04W 12/02 455/411 |
| 8,655,389 B1 * | 2/2014 | Jackson | G01S 19/39 455/414.1 |
| 2001/0055975 A1 | 12/2001 | McDonnell et al. | |

(Continued)

FOREIGN PATENT DOCUMENTS

| | | |
|---|---|---|
| GB | 2526614 A | 12/2015 |
| WO | 2005117481 A1 | 12/2005 |

(Continued)

OTHER PUBLICATIONS

IBM: List of IBM Patents or Patent Applications Treated as Related (Appendix P), Jan. 4, 2016, pp. 1-2.

(Continued)

*Primary Examiner* — Adolf Dsouza
(74) *Attorney, Agent, or Firm* — David Zwick; Isaac J. Gooshaw (57) ABSTRACT

A technique for anonymizing location information of a mobile device includes intercepting, by the mobile device, a request for access to actual location information of the mobile device made by an application. The mobile device redirects the request to a trusted edge server. The trusted edge server obfuscates the location information based on a location of one or more other mobile devices proximal to the mobile device to generate obfuscated location information. The one or more other mobile devices are selected based on a similarity between a user profile associated with the mobile device and user profiles associated with the one or more other mobile devices. The trusted edge server returns the obfuscated location information to the mobile device, which sends the obfuscated location information to the application in place of the requested location information.

18 Claims, 5 Drawing Sheets

(56) References Cited

U.S. PATENT DOCUMENTS

| | | | |
|---|---|---|---|
| 2002/0004399 | A1 | 1/2002 | McDonnell et al. |
| 2005/0114694 | A1* | 5/2005 | Wager .................. H04L 9/3271 726/26 |
| 2007/0264974 | A1 | 11/2007 | Frank et al. |
| 2010/0064373 | A1* | 3/2010 | Cai ..................... G06F 21/6254 726/26 |
| 2012/0034930 | A1 | 2/2012 | Zellner et al. |
| 2012/0276927 | A1 | 11/2012 | Pitt |
| 2012/0317205 | A1 | 12/2012 | Lahiani et al. |
| 2013/0254071 | A1 | 9/2013 | Oley |
| 2013/0346211 | A1 | 12/2013 | Zellner et al. |
| 2015/0067880 | A1 | 3/2015 | Ward et al. |
| 2015/0350890 | A1 | 12/2015 | Arunkumar et al. |

FOREIGN PATENT DOCUMENTS

| | | |
|---|---|---|
| WO | 2012170314 A2 | 12/2012 |
| WO | 2013178284 A1 | 12/2013 |

OTHER PUBLICATIONS

Gedik et al., "Location Privacy in Mobile Systems: A Personalized Anonymization Model," Proceedings of the 25th IEEE International Conference on Distributed Computing Systems (ICSCS), Jun. 10, 2005.

Search Report (United Kingdom), Application No. GB1409608.5, Reference: GB920140024GB1, Date of Search: Oct. 10, 2014, pp. 1-3.

Disclosed Anonymously, "Method and System for creating anonymity in Snapshot (Single-Query) Location-Based Services," IP.com No. 000230783, Sep. 12, 2013, pp. 1-5.

Mano et al., "Anonymizing User Location and Profile Information for Privacy-aware Mobile Services," Proceedings of the 2nd ACM SIGSPATIAL International Workshop on Location Based Social Networks (LBSN), Nov. 2, 2010, pp. 68-75.

Gedik et al., "Protecting Location Privacy with Personalized k-Anonymity: Architecture and Algorithms," IEEE Transactions on Mobile Computing, vol. 7, No. 1, Jan. 2008, pp. 1-18.

Samarati et al., "Protecting Privacy when Disclosing Information: k-Anonymity and Its Enforcement through Generalization and Suppression," IEEE Transactions on Knowledge and Data Engineering, 2001, pp. 1-19.

Sweeney, "k-Anonymity: A Model for Protecting Privacy," International Journal on Uncertainty, Fuzziness and Knowledge-based Systems, vol. 10, Issue 5, May 2002, pp. 1-14.

Kalnis et al. "Preventing location-based identity inference in anonymous spatial queries." Knowledge and Data Engineering, IEEE Transactions on 19.12 , 1719-1733, 2007.

Kido et al. "An anonymous communication technique using dummies for location-based services." Pervasive Services. ICPS'05. Proceedings. International Conference on. IEEE, Jul. 2005.

GB Search Report, Application No. GB1409610.1, dated Oct. 10, 2014, IBM United Kingdom Limited, Intellectual Property Law, Hursley Park, Winchester, Hampshire, SO21 2JN, 4 pages.

Abandoned Application 1409608.5, filed May 30, 2014, entitled: "Anonymizing Location Information of a Mobile Device", pp. 1-26.

Pending U.S. Appl. No. 15/046,529, filed Feb. 18, 2016, entitled: "Anonymizing Location Information of a Mobile Device", pp. 1-33.

IBM: List of IBM Patents or Patent Applications Treated as related (Appendix P), Feb. 8, 2016, pp. 1-2.

Pending U.S. Appl. No. 15/046,529, filed on Feb. 18, 2016, titled "Anonymizing Location Information of a Mobile Device," pp. 1-33.

Pending U.S. Appl. No. 14/669,020, filed on Mar. 26, 2015, titled "Anonymizing Location Information of a Mobile Device," pp. 1-35.

US 8,626,728, 01/2014, Kalavade (withdrawn)

\* cited by examiner

| User | Alpha | Bravo | Charlie | Delta | Echo |
|---|---|---|---|---|---|
| Music<br>Cuisine<br>Beverage<br>Sport | Rock<br>Italian<br>Coffee<br>Soccer | Jazz<br>Chinese<br>Juice<br>Baseball | Jazz<br>Thai<br>Tea<br>Basketball | Opera<br>Thai<br>Tea<br>Ice hockey | Rock<br>Italian<br>Cola<br>Basketball |

| User | Foxtrot | Golf | Hotel | India | Juliet |
|---|---|---|---|---|---|
| Music<br>Cuisine<br>Beverage<br>Sport | Rock<br>Thai<br>Cola<br>Baseball | Opera<br>Italian<br>Coffee<br>Soccer | Rock<br>Chinese<br>Coffee<br>Basketball | Hip hop<br>Indian<br>Cola<br>Baseball | Jazz<br>Thai<br>Cola<br>Baseball |

TECHNIQUES FOR LOCATION INFORMATION CONTROL USING USER PROFILES

This application claims priority to United Kingdom Patent Application 1409610.1, entitled "LOCATION INFORMATION CONTROL USING USER PROFILES," filed on May 30, 2014. The disclosure of United Kingdom Patent Application 1409610.1 is hereby incorporated herein by reference in its entirety for all purposes.

BACKGROUND

This application is generally directed to location information control and, more particularly, to location information control using user profiles.

In a mobile micro-cloud setting having multiple entities there are various concerns relating to trust and vulnerability. One of these concerns is the release of information about a mobile device user's location to service providers when using services.

Prior art solutions, typically implemented in smart phones, transmit a location and an identity with a query when making a location-based service query. By default the service providers use location information and, as such, know the location of a service recipient. This is a major breach of privacy of the service recipient if the service recipient does not want to share the location information. In general, service providers desire to know as much as possible about mobile device users in order to be able to perform marketing campaigns that are as directed as possible to the mobile device users. Additionally, service providers may also misuse location information and also pass it on to third party applications who further misuse the location information.

PCT Patent Application No. WO2005/117481 A1 discloses keeping the identity of a user of a mobile device secret, while managing requests for information in an information distribution system. The identity of the user of the mobile device is kept secret by using a persistent pseudonym and a temporary pseudonym, which are associated with a user identity. The process of information distribution is enhanced by the use of licenses and certificates, which the user obtains by representing himself with the permanent pseudonym. When accessing requested information, the user is represented by the temporary pseudonym.

United States Patent Application Publication No. 2009/0248680 A1 discloses a system and method for sharing anonymous user profiles with a third party. The system shares user profiles with content servers on a mobile data network so that they may select content responsive to a user's profile. The system provides a store of user profiles for associating profile information with either a source Internet protocol (IP) address or mobile phone number, where the profiles include user information and user network usage. The system detects a user's transaction request and inspects it for either an IP address or phone number, which it uses to retrieve an appropriate profile. The system subsequently applies predetermined opt-out policies to determine how much of a user profile may be provided in response to a profile request. The system then returns the profile information such that a user location is masked.

BRIEF SUMMARY

Disclosed are a method, a data processing system, and a computer program product (embodied in a computer-readable storage device) for controlling location information using user profiles.

A technique for anonymizing location information of a mobile device includes intercepting, by the mobile device, a request for access to actual location information of the mobile device made by an application. The mobile device redirects the request to a trusted edge server. The trusted edge server obfuscates the location information based on a location of one or more other mobile devices proximal to the mobile device to generate obfuscated location information. The one or more other mobile devices are selected based on a similarity between a user profile associated with the mobile device and user profiles associated with the one or more other mobile devices. The trusted edge server returns the obfuscated location information to the mobile device, which sends the obfuscated location information to the application in place of the requested location information.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, data processing system, and a computer program product (embodied in a computer-readable storage device) for controlling location information using user profiles.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized. As may be utilized herein, the term 'coupled' encompasses a direct electrical connection between components or devices and an indirect electrical connection between components or devices achieved using one or more intervening components or devices.

One or more embodiments disclose a method for anonymizing location information of a mobile device. In at least one embodiment, the method comprises providing a trusted edge server at a network edge with the mobile device intercepting a request for access to location information made by an application. The mobile device redirects the request to a trusted edge server and the trusted edge server obfuscates the location information, based on the location of one or more other mobile devices proximal to the querying mobile device to generate an obfuscated location information. The one or more other mobile devices are selected based on a similarity between user profiles associated with the mobile device and the one or more other mobile devices. The trusted edge server returns the obfuscated location information to the mobile device and the mobile device sends the obfuscated location information to the application. Disclosed embodiments provide the advantage that privacy of the location information associated with a mobile device is preserved, while the response received from a service provider to a location-based service request is still sufficiently accurate to be useful.

In one embodiment, the location information is supplied to the mobile device by a position location system. This has the advantage of both improved accuracy of location information and improved usability for an end user. In an embodiment, the mobile device redirecting the request includes the mobile device submitting its location information and a category from the user profile associated with the mobile device to the trusted edge server. In an embodiment, the trusted edge server obfuscating the location information includes the trusted edge server accessing user profiles associated with the requesting mobile device and the one or more other mobile devices and identifying one of the one or more other mobile devices having a preference in the category the same as that of the mobile device submitting its location information. This has the advantage of enabling location-based queries based on preferences within a user profile to receive accurate responses without accurate location information of the mobile device being disclosed.

A desired level of anonymity "k" may be provided by an end user and submitted to the trusted edge server. The trusted edge server then obfuscates the location information such that the desired level of anonymity "k" is achieved. In an embodiment, categories other than those for which a preference has been expressed are further used to determine which one of the one or more other mobile devices are selected. In another embodiment, profiles associated with a plurality of the one or more other mobile devices are used to determine which one of the one or more other mobile devices are selected.

Disclosed embodiments also provide a system for anonymizing location information of a mobile device. In one or more embodiments, the system includes a trusted edge server located at a network edge and a mobile device configured to intercept a request for access to location information made by an application executing on the mobile device. The mobile device is further configured to redirect the request to a trusted edge server and to receive obfuscated location information from the trusted edge server. In various embodiments, the trusted edge server is configured to obfuscate the location information, based on the location of one or more other mobile devices proximal to the querying mobile device, and generate an obfuscated location information. The one or more other mobile devices may be selected based on a similarity between user profiles associated with the mobile device and the one or more other mobile devices. The trusted server is further configured to return the obfuscated location information to the mobile device.

Disclosed embodiments also provide a computer program product for anonymizing location information of a mobile device. The computer program product may include a computer-readable storage device having computer readable program code embodied thereon. The computer-readable program code, when executed, is configured to cause a computer (data processing system) to perform the method described above.

Figure 1:
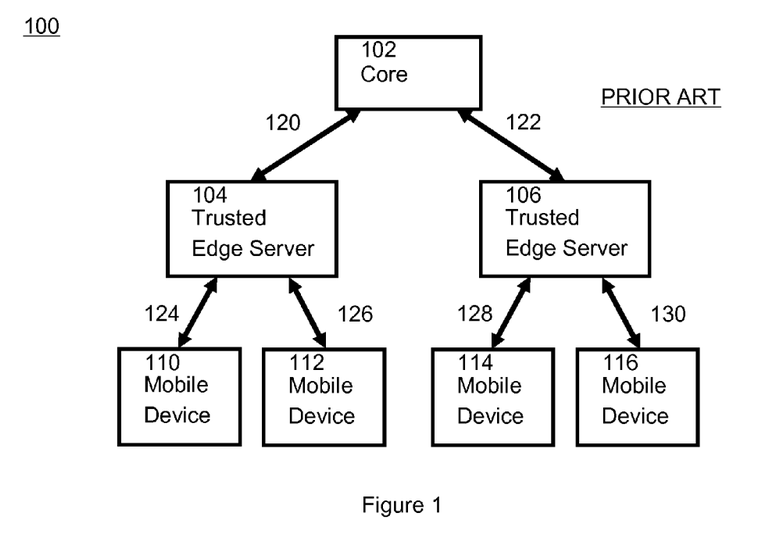
FIG. 1 shows a block diagram of a prior art mobile micro-cloud architecture.

FIG. 1 shows a prior art mobile micro-cloud architecture having a core 102 connected through network links 120, 122 to one or more trusted edge servers 104, 106 and through further network links 124, 126, 128, 130 to mobile devices 110, 112, 114, 116. Typically, the core 102 has access to large quantities of static information and the trusted edge servers 104, 106 have access to smaller quantities of real-time and dynamic data. The trusted edge servers 104, 106 may be located at a Wi-Fi access point or at a cellular base station or the like. Although FIG. 1 shows two trusted edge servers 104, 106 and four mobile devices 110, 112, 114, 116, the number of each of these elements is purely exemplary and any number of these elements may be used in embodiments of the present invention. The network links 120, 122, 124, 126, 128, and 130 may be wired or wireless network links and may use any format that the elements at each end of the link understand. Although not shown in FIG. 1, there may be additional network or other connections between each of the edge servers 104, 106.

Figure 2:
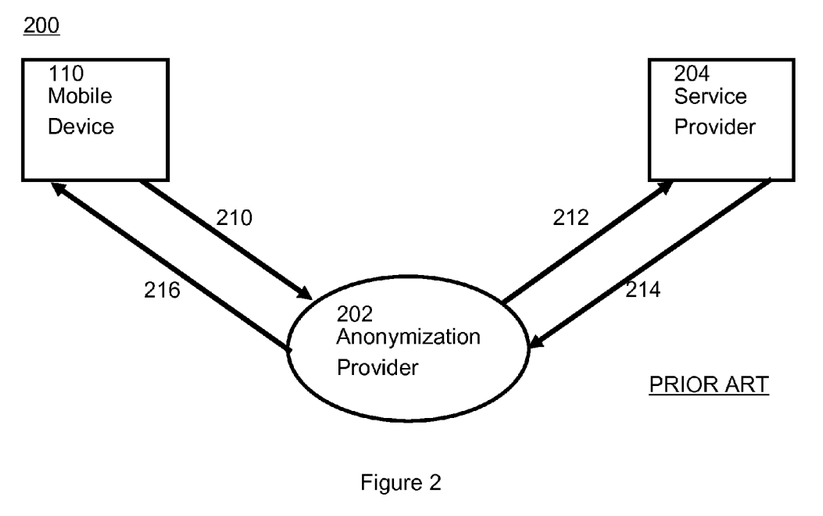
FIG. 2 shows a block diagram of a prior art anonymization session.

FIG. 2 shows a block diagram of a prior art anonymization session. As is illustrated, the mobile device 110 sends 210 a request to the anonymization provider 202, which obfuscates the location data contained in the request prior to sending 212 it on to the service provider 204. The service provider 204 response is returned 214 through the anonymization provider 202, which sends 216 the response to the mobile device 110. There are at least two problems with this prior art anonymization of location data. First, the use of an anonymization provider 202 is revealed to the service provider 204. The service provider 204 may therefore infer that location data contained in the request has been modified by the anonymization provider 202. The ability of the service provider 204 to infer this may not be desired by the mobile device 110.

Second, there is an additional risk that the anonymization provider 202 directs an attack on session data passing between the mobile device 110 and the service provider 204, such as in a man-in-the-middle attack. The service provider 204 may be a regular web service located at the core 102 or at the trusted edge server 104, 106. The service provider 204 may be located at the mobile device 110 as an application, at the trusted edge server 104, 106, or at the core 102. The anonymization provider 202 is located at the trusted edge server 104, 106. Embodiments of the present disclosure extend known solutions for anonymizing location data by introducing an additional interaction in the session protocol between the service consumer, for example, the mobile device 110 and the service provider 204, for example, a web service.

Figure 3:
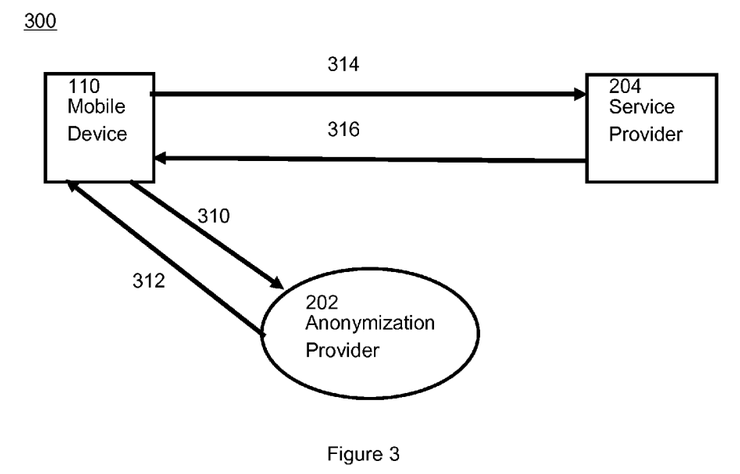
FIG. 3 shows a block diagram of an anonymization session according to embodiments of the present disclosure.

FIG. 3 shows a block diagram of an anonymization session according to disclosed embodiments. The anonymization session of FIG. 3 is designed to enforce the privacy requirements of service consumers, such as mobile device 110, thereby mitigating the first problem identified above.

Additionally, the anonymization session of FIG. 3 helps to mitigate the more traditional information security threat in the second concern identified above. Disclosed embodiments add an additional interaction in the session protocol between the mobile device 110 and the service provider 204. The service provider 204 is now unaware of the presence of the anonymization provider 202 by virtue of the breaking of the link between them found in prior art anonymization approaches. In a successful session, the mobile device 110 requests 310 anonymization of location data from the anonymization provider 202 and receives 312 obfuscated location data from the anonymization provider 202. The mobile device 110 then forwards 314 the obfuscated location data to the service provider 204. The service provider 204 is thus unaware of the existence of the anonymization provider 202 in this system by simple analysis of the incoming request.

The service provider 204 returns 316 the response back to the mobile device 110. With appropriate validation at the mobile device 110, the anonymization provider 202 cannot successfully mount an attack on the data, such as a man-in-the-middle attack because the data passes from the mobile device 110 to the service provider 204 without passing through the anonymization provider 202. The embodiment of FIG. 3 preserves the privacy of the location information and is still able to get the results for the query based on the location information. As with the prior art system of FIG. 2, the service provider 204 may be a regular web service located at the core 102 or at the trusted edge server 104, 106. In various embodiments, the service provider 204 is located at the mobile device 110 as an application and the anonymization provider 202 is located at the trusted edge server 104, 106.

Figure 4:
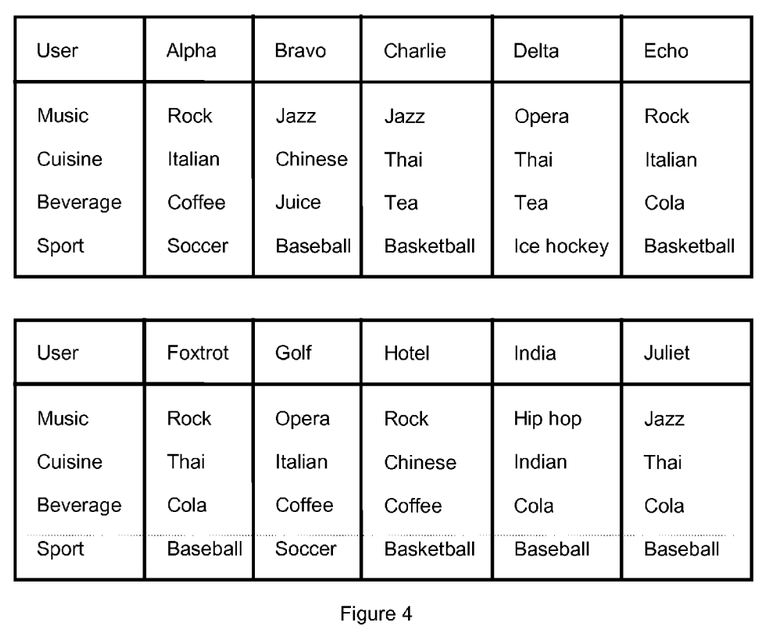
FIG. 4 shows sample profiles of ten users (i.e., Alpha through Juliet) and their preferences for Music, Cuisine, Beverage, and Sport.

FIG. 4 shows simple profiles of ten users (i.e., Alpha through Juliet) and their preferences for music, cuisine, beverage and sport. User names are listed across the top, the first part of the table showing users Alpha through Echo and the second part of the table showing users Foxtrot through Juliet. User preferences for the categories of music, cuisine, beverage and sport are listed down the left side of the table and the preference of a user for a category is shown at the intersection of the user and the category. For example, user Bravo has a preference for Chinese cuisine and user Hotel has a preference for coffee as a beverage.

Although FIG. 4 shows ten users, embodiments may be implemented in systems having any number of users. For example three users or three hundred users may be implemented and the user names are not restricted to those shown, but may be any name that can be used by a user to identify themselves. Also, although FIG. 4 shows preferences for music, cuisine, beverage and sport, embodiments are not restricted to music, cuisine, beverage and sport, but may be anything for which preferences may be expressed, for example, hobbies. Further, although particular choices are shown for preferences for music, cuisine, beverage and sport, other preferences may be used, for example, Disco for Music, Mexican for Food, Water for Beverage and American Football for Sport.

Figure 5:
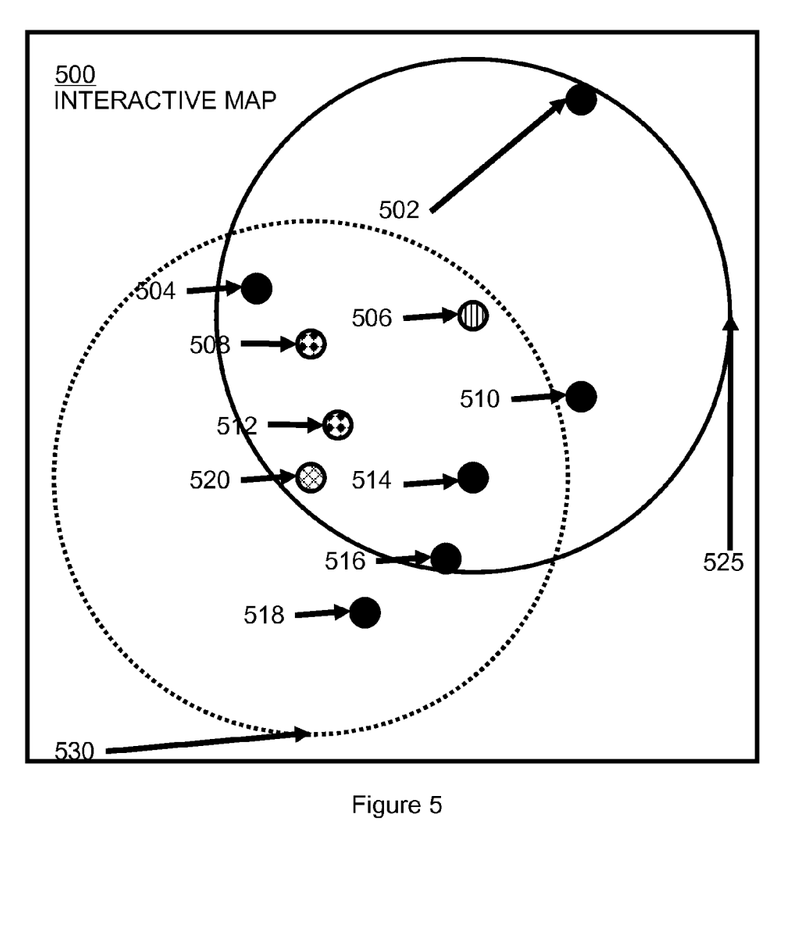
FIG. 5 shows an interactive map used in an embodiment of the present disclosure.

FIG. 5 shows an interactive map 500 for use in an embodiment of the present disclosure, which is trusted edge server 104, 106 based. The interactive map 500 may include any number of geographical and/or physical features displayed to a user which are not shown in FIG. 5 for clarity. Locations 502 to 520 show locations of mobile device 110, 112, 114, and 116, users Alpha through Juliet of FIG. 4, comprising the location 506 of the mobile device 110 whose user Charlie desires anonymization of location data and the locations 502, 504, 508-520 of other mobile device 112, 114, and 116 users. Mobile devices 110, 112, 114, and 116 of FIG. 1 are exemplary in number and may be any number.

In the example of FIG. 5, ten mobile devices 110, 112, 114, 116 are shown. One of the locations 506 is identified as the mobile device 110 of the user Charlie who desires anonymization of location data, while the other locations 502, 504, 508-518 are respectively the locations of other mobile device 112, 114, 116 users Alpha, Bravo and Delta-India. Another of the locations 520, of user Juliet, is identified in FIG. 5 as the obfuscated location to be returned to the mobile device 110 by the anonymization provider 202 for sending as the obfuscated location with the query to the service provider 204. In this example, that location is that of user Juliet. Typically, the scale of the map will be chosen such that there are about "k" different mobile devices 112, 114, 116 shown. As used herein, "k" corresponds to the level of anonymity desired by the user of the mobile device 110. The solid line circle 525 and the dashed line circle 530 are explained below with reference to block 616 of FIG. 6.

Figure 6:
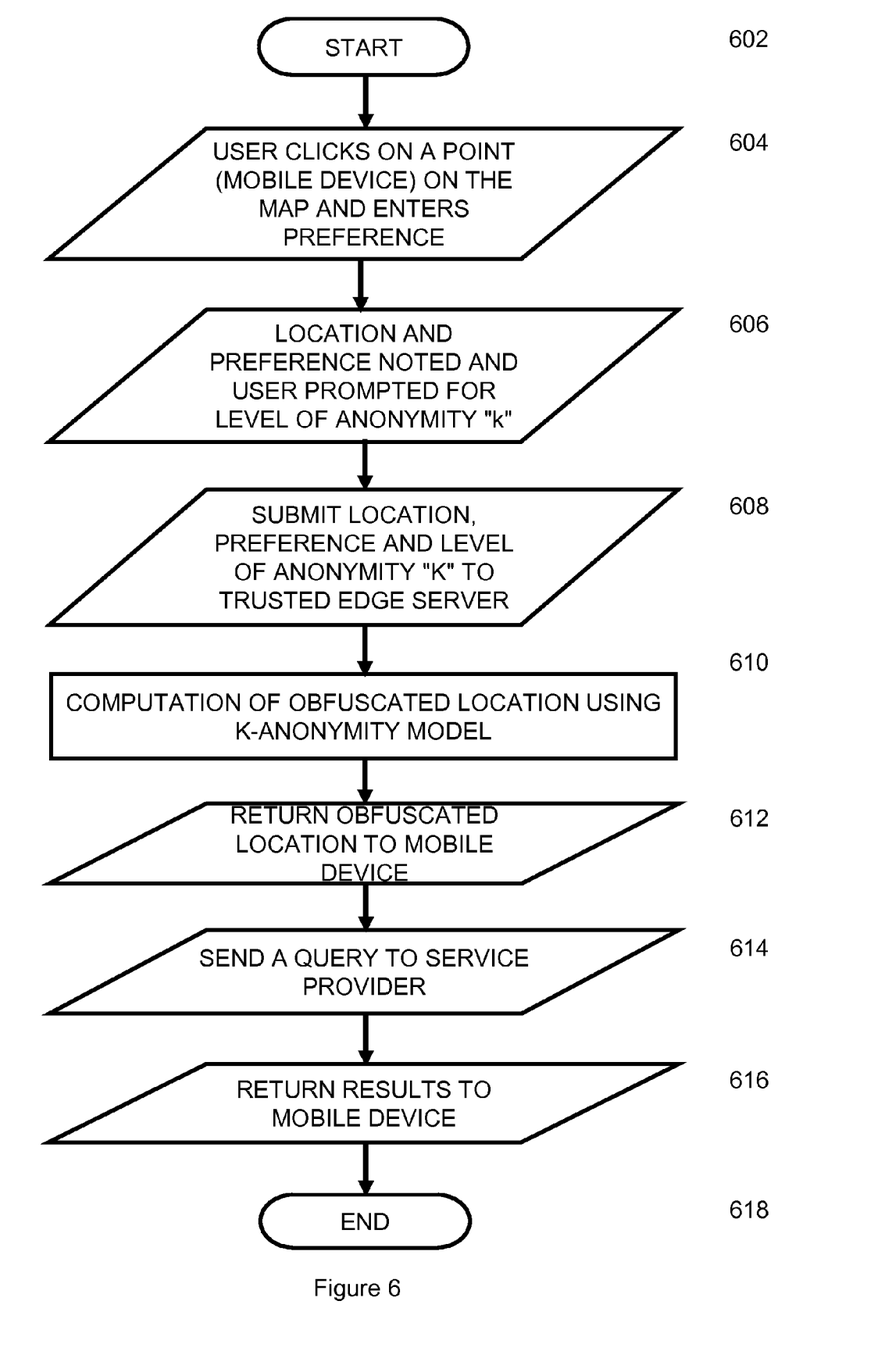
FIG. 6 shows a flow chart of location information control using user profiles according to the present disclosure.

Referring to FIG. 6, a method according to an embodiment of the present disclosure starts at block 602. At block 604, a user, such as user Charlie, clicks on the interactive map 500 displayed at the mobile device 110 to indicate the position of the user. The mobile device 110 user's current location 506 may be selected by the user or may be directly input using a position location system, such as GPS or by use of identification of a current connection within a cellular wireless network. A user may, optionally, be asked to confirm a position supplied by a position location system. In the example of FIG. 5, the user, Charlie, has clicked on the map at location 506. The locations 502, 504, and 508-520 of the other mobile devices 112, 114, and 116 do not appear on the map displayed to the user, but are known only to the trusted edge server 104, 106. The desired location 506 may be identified by latitude and longitude, by use of grid coordinates, or any other way in which a current location 506 of the user Charlie may be identified.

Also at block 604, the user enters the category that is associated with the query that the user wishes to make of a service provider 204. For example, if the user wishes to make a query of the service provider 204 of restaurants located near the user's location 606, then the user may enter the category of "Cuisine". In an embodiment, the user sends only the category and the anonymization provider 202 looks up the user preference of, for example, "Thai" for user Charlie in its stored profiles. In another embodiment, the user may also send the data that is associated with their preference, that is, for example, for user Charlie, "Thai." At block 606, on clicking on the location of the user's mobile device 110, the mobile device's 110 location will be noted at the mobile device 110 as will the users selection of category and the data associated with their preference if it is submitted. Also at block 606, the user is prompted at the mobile device 110 for the desired level of anonymity "k". In one embodiment, a value for the desired extent of location obfuscation "1" is not requested and is not sent. In an alternative embodiment, a value for the desired extent of location obfuscation "1" is also optionally requested from a user and may be sent with the value for the level of desired anonymity "k". The sending of a value for the desired extent of location obfuscation "1" allows a user to indicate that they desire the obfuscated location 520 to fall within the distance "1" of the user's actual location 506.

At block 608, the details are submitted by the mobile device 110 to the trusted edge server 104, 106. In one embodiment, this submission is through a HTTP post. The details may typically include the location, preference, and level of anonymity "k". Typically, the details do not include the extent of location obfuscation "1", although this may optionally be included. The trusted edge server 104, 106 knows the location of at least "k"-1 other mobile devices 112, 114, 116. At block 610, the obfuscated location 520 is computed using the k-anonymity model.

Figure 7:
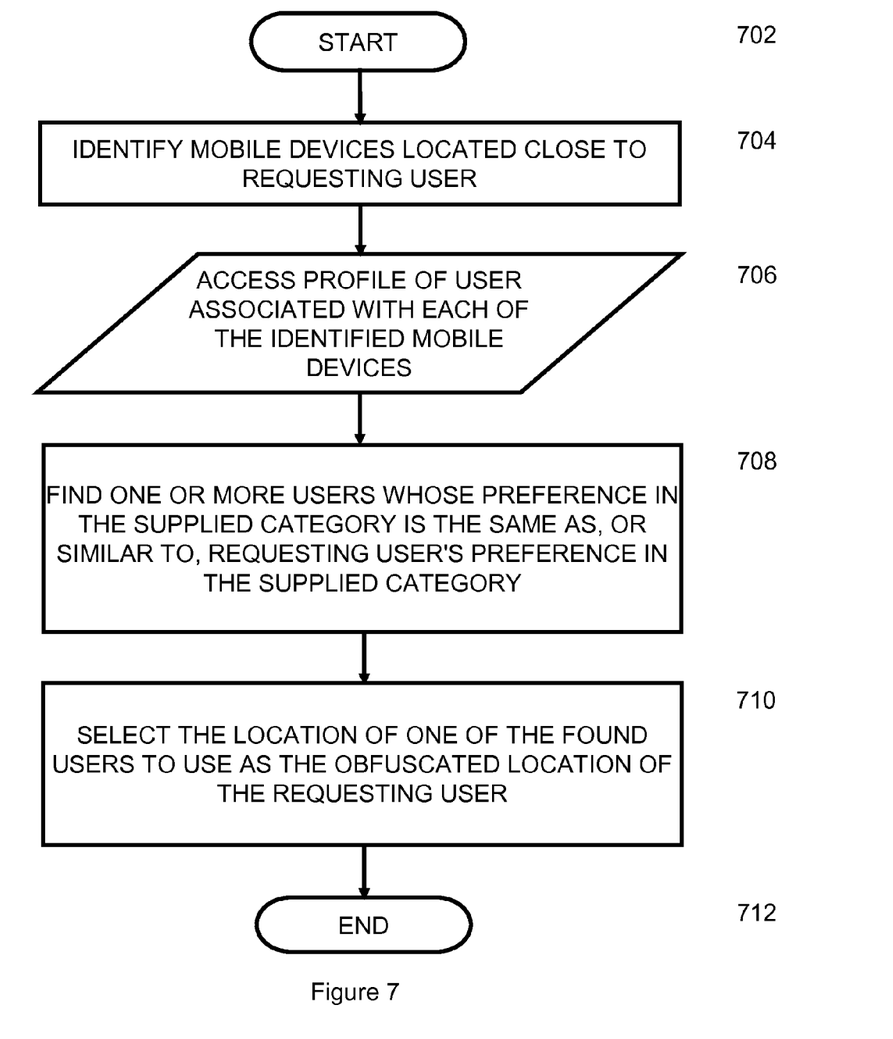
FIG. 7 shows a flow chart of a block in FIG. 6 that computes an obfuscated location.

Referring to FIG. 7, which shows a flow chart in more detail of block 610 in FIG. 6, the computation starts at block 702. At block 704, the trusted edge server 104, 106 identifies the mobile devices 110, 112, 114, and 116 of users (such as users Alpha through Juliet) which are located close to user Charlie in order to achieve k-anonymity. In an exemplary embodiment, 'k' is equal to 10, so the trusted edge server 104, 106 identifies 'k-1', that is 9, other mobile devices 112, 114, and 116. At block 706, trusted edge server 104, 106 then accesses the user profile of each of the other mobile devices 112, 114, and 116. At block 708, trusted edge server 104, 106 finds one or more users Alpha through Juliet whose preference in the supplied category is the same, or similar to, the preference stored in the accessed profile for user Charlie who is requesting obfuscation of their location.

As the user Charlie has entered the category of "Cuisine", the trusted edge server 104, 106 looks for data associated with users of other mobile devices 110, 112, 114, and 116 whose preference for the category of "Cuisine" is "Thai". In the example profiles of FIG. 4, that corresponds to users Charlie, Delta, Foxtrot and Juliet. In the interactive map of FIG. 5, these users may be located at locations 506, 508, 512 and 520. At block 710, the trusted edge server 104, 106 select any one of the locations 508, 512, 520 as an obfuscated location to return to user Charlie. Clearly, the edge server 104, 106 should not choose location 506 to return as an obfuscated location as that is the real location of user Charlie. The computation ends at block 712.

Profiles containing preferences that are not identical to the requested preference may be selected to provide obfuscated locations, such as, for example, profiles containing Oriental as a Cuisine preference may also be available for selection when Thai was requested as a cuisine preference. Further, categories other than those for which a preference has been expressed may be used to help determine which user's location should be returned as an obfuscated location. In the example of FIG. 4, in addition to sharing a Cuisine preference of Thai with users Delta, Foxtrot, and Juliet, user Charlie shares a Beverage preference of Tea with user Delta and a Music preference of Jazz with user Juliet. User Charlie shares no other preferences with user Foxtrot. Users Delta and Juliet could be seen as having profiles that are more similar to user Charlie than the profile of user Foxtrot. In other embodiments, the preferences of multiple users may be mixed with the preferences of the user making a query. By doing this the service provider 204 will not be able to distinguish who the actual user making the query is amongst the population of 'k' users.

A person skilled in the art will be familiar with the comparison of profiles according to the "distance" between the profiles. Here, distance refers to the distance between profiles and not the geographical separation of the user's locations. The concept of mixing user identifiers have been around for several decades, for example, Chaumian mix as disclosed in Chaum, D. L. (1981) "Untraceable electronic mail, return addresses, and digital pseudonyms". Communications of the ACM 24, 2, Feb. 1981, pp. 84-90. A Chaumian mix allows a group of senders to submit an encryption of a message and its recipient to a server. Once the server has a batch of messages, it will reorder and obfuscate the messages so that only this server knows which message came from which sender. The batch is then forwarded to another server who does the same process. Eventually, the messages reach the final server where they are fully decrypted and delivered to the recipient.

A mechanism to allow return messages is also disclosed. In a typical application, it is desirable that the trusted edge server 104, 106 selects a minimum extent of location obfuscation "1" that will satisfy the level of anonymity "k". However, for some applications, it is desirable to specify a maximum extent of location obfuscation "1" because the utility of the application executing on the mobile device 110 drops sharply beyond that extent. For example, if the location is being provided in order to identify the nearest Thai restaurant, then whilst a minimum extent of location obfuscation "1" is needed for anonymity, there is a maximum extent of location obfuscation "1" for the response to the query to be useful. An extent of location obfuscation "1" of 50 kilometers may not be very helpful if it means that the response to the query returns a restaurant that is 49 kilometers away, when there are many other restaurants associated with the same cuisine that are closer to the mobile device's 110 real location 506.

At block 612, the obfuscated location 520 is returned by the trusted edge server 104, 106 to the mobile device 110. Optionally, once the obfuscated position is received, it may be highlighted on the interactive map 500 at the mobile device 110 by showing the true location 506 and the received anonymized location 520. The locations 502, 504 and 508-518 of the other mobile devices 112, 114, 116 do not appear on the map displayed to the user, but are known only to the trusted edge server 104, 106. At block 614 the mobile device 110 sends a query to the service provider 204 including the anonymized location 520 data. The query may be to a location based service such as where the nearest Thai restaurant may be found.

At block 616, the results of the query are returned from the service provider 204 to the mobile device 110. The results may be the locations of the nearest Thai restaurants to the obfuscated location 520. The results may exclude some Thai restaurants that are closer to the user's real location, that is any location within the solid line circle 525 centered on the real location 506, but outside the dashed line circle 530 centered on the obfuscated location 520. The results may include other Thai restaurants that are further from the user's real location 506, that is any location within the dashed line circle 530 centered on the obfuscated location 520, but outside the solid line circle 525 centered on the user's real location 506. However, the results will likely include some Thai restaurants that are closer to the user's location 506, that is within both the solid line circle 525 centered on the real location 506 and the dashed line circle 530 centered on the obfuscated location 520. In the example of FIG. 5, the dashed line circle 530 is shown as being the same size as the extent of obfuscation "1", but in practice it is likely to be different and will likely be provided by the end user when making the request to the service provider. For example, the user may request from the anonymization provider 202 an extent of location obfuscation of 200 meters (the radius of the solid line circle 525 centered on the user's location 506), but desires to know from the service provider 204 of any Thai restaurants within 500 meters (the radius of the dashed line circle 530 centered on the obfuscated location 520). The method ends at block 618.

Accordingly, techniques have been disclosed herein that advantageously control location information using user profiles.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for anonymizing location information of a mobile device, comprising:
   intercepting, by a mobile device, a request for access to actual location information of the mobile device made by an application;
   redirecting, by the mobile device, the request to a trusted edge server;
   obfuscating, by the trusted edge server, the location information based on a location of one or more other mobile devices proximal to the mobile device to generate obfuscated location information, wherein the one or more other mobile devices are selected based on a similarity between a user profile associated with the mobile device and user profiles associated with the one or more other mobile devices;
   returning, by the trusted edge server, the obfuscated location information to the mobile device; and
   sending, by the mobile device, the obfuscated location information to the application in place of the requested location information.

2. The method of claim 1, wherein the actual location information is supplied to the mobile device by a position location system.

3. The method of claim 1, wherein the redirecting, by the mobile device, the request includes the mobile device submitting the actual location information and a category from the user profile to the trusted edge server, and wherein the obfuscation of the location information includes the trusted edge server accessing the user profile associated with the mobile device and the user profiles associated with the one or more other mobile devices and identifying one of the one or more other mobile devices having a preference in the category similar to that of the mobile device.

4. The method of claim 1, wherein a desired level of anonymity "k" is provided by an end user and submitted to the trusted edge server and the trusted edge server obfuscates the actual location information such that the desired level of anonymity "k" is achieved.

5. The method of claim 1, wherein categories other than those for which a preference has been expressed are further used to determine which one of the one or more other mobile devices is selected.

6. The method of claim 1, wherein profiles associated with a plurality of the one or more other mobile devices are used to determine which one of the one or more other mobile devices is selected.

7. A system for anonymizing location information, comprising:
   a mobile device; and
   a trusted edge server in communication with the mobile device, wherein the mobile device is configured to intercept a request for access to actual location information of the mobile device made by an application and redirect the request to the trusted edge server, and wherein the trusted edge server is configured to obfuscate the location information based on a location of one or more other mobile devices proximal to the mobile device to generate obfuscated location information, where the one or more other mobile devices are selected based on a similarity between a user profile associated with the mobile device and user profiles associated with the one or more other mobile devices, and where the trusted edge server is configured to return the obfuscated location information to the mobile device and the mobile device is configured to send the obfuscated location information to the application in place of the requested location information.

8. The system of claim 7, wherein the actual location information is supplied to the mobile device by a position location system.

9. The system of claim 7, wherein the redirecting, by the mobile device, the request includes the mobile device submitting the actual location information and a category from the user profile to the trusted edge server, and wherein the obfuscation of the location information includes the trusted edge server accessing the user profile associated with the mobile device and the user profiles associated with the one or more other mobile devices and identifying one of the one or more other mobile devices having a preference in the category similar to that of the mobile device.

10. The system of claim 7, wherein a desired level of anonymity "k" is provided by an end user and submitted to the trusted edge server and the trusted edge server obfuscates the actual location information such that the desired level of anonymity "k" is achieved.

11. The system of claim 7, wherein categories other than those for which a preference has been expressed are further used to determine which one of the one or more other mobile devices is selected.

12. The system of claim 7, wherein profiles associated with a plurality of the one or more other mobile devices are used to determine which one of the one or more other mobile devices is selected.

13. A computer program product for controlling a system, the computer program product comprising:
> a non-transitory computer-readable storage device;
> computer-readable program code embodied on the non-transitory computer-readable storage device, wherein the computer-readable program code, when executed by a system, configures the system to:
> intercept, by a mobile device of the system, a request for access to actual location information of the mobile device made by an application;
> redirect, by the mobile device, the request to a trusted edge server of the system;
> obfuscate, by the trusted edge server, the location information based on a location of one or more other mobile devices proximal to the mobile device to generate obfuscated location information, wherein the one or more other mobile devices are selected based on a similarity between a user profile associated with the mobile device and user profiles associated with the one or more other mobile devices;
> return, by the trusted edge server, the obfuscated location information to the mobile device; and
> send, by the mobile device, the obfuscated location information to the application in place of the requested location information.

14. The computer program product of claim 13, wherein the actual location information is supplied to the mobile device by a position location system.

15. The computer program product of claim 13, wherein the redirecting, by the mobile device, the request includes the mobile device submitting the actual location information and a category from the user profile to the trusted edge server, and wherein the obfuscation of the location information includes the trusted edge server accessing the user profile associated with the requesting mobile device and the user profiles associated with the one or more other mobile devices and identifying one of the one or more other mobile devices having a preference in the category similar to that of the mobile device.

16. The computer program product of claim 13, wherein a desired level of anonymity "k" is provided by an end user and submitted to the trusted edge server and the trusted edge server obfuscates the actual location information such that the desired level of anonymity "k" is achieved.

17. The computer program product of claim 13, wherein categories other than those for which a preference has been expressed are further used to determine which one of the one or more other mobile devices is selected.

18. The computer program product of claim 13, wherein profiles associated with a plurality of the one or more other mobile devices are used to determine which one of the one or more other mobile devices is selected.

* * * * *